US011631335B2

(12) United States Patent
Fanelli et al.

(10) Patent No.: US 11,631,335 B2
(45) Date of Patent: Apr. 18, 2023

(54) FLIGHT PLANNING USING OBSTACLE DATA

(71) Applicant: Verizon Patent and Licensing Inc., Arlington, VA (US)

(72) Inventors: Matthew S. Fanelli, Washington, DC (US); Shane Pierce Williams, Monument, CO (US); Jonathan Evans, Portland, OR (US); Tariq Rashid, Jacksonville, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 463 days.

(21) Appl. No.: 16/862,718

(22) Filed: Apr. 30, 2020

(65) Prior Publication Data

US 2020/0258402 A1    Aug. 13, 2020

Related U.S. Application Data

(63) Continuation of application No. 15/949,855, filed on Apr. 10, 2018, now Pat. No. 10,672,281.

(51) Int. Cl.
*G08G 5/00* (2006.01)
*B64C 39/02* (2023.01)
(Continued)

(52) U.S. Cl.
CPC ......... *G08G 5/0069* (2013.01); *B64C 39/024* (2013.01); *G08G 5/003* (2013.01);
(Continued)

(58) Field of Classification Search
CPC .... G08G 5/0069; G08G 5/045; G08G 5/0086; G08G 5/0082; G08G 5/0078;
(Continued)

(56) References Cited

U.S. PATENT DOCUMENTS 8,577,538 B2    11/2013   Lenser et al.
2010/0238161 A1   9/2010   Varga et al.
(Continued)

OTHER PUBLICATIONS

ForeFlight, "Global Synthetic Vision", Jan. 22, 2018 (print date), 7 pages, Retrieved from the internet [URL: https://foreflight.com/products/foreflight-mobile/synthetic-vision/].
(Continued)

*Primary Examiner* — Behrang Badii

(57) ABSTRACT

A device can receive obstacle data from a plurality of sources. The obstacle data can include location data associated with obstacles. The device can determine weightings for the obstacles based on the plurality of sources. Each of the weightings can indicate a measure of reliability/accuracy of the information regarding an obstacle. The device can process the obstacle data to associate the obstacles with airspace voxel(s), that represent one or more 3D portions of airspace, based on the location data, receive flight parameters relating to a proposed flight plan of a UAV through airspace represented by a set of airspace voxels, determine whether the set of airspace voxels includes any of the airspace voxel(s), and perform one or more actions to cause a recommendation, regarding the proposed flight plan and based on the determination, to be provided. The recommendation can be based on one or more of the weightings.

20 Claims, 6 Drawing Sheets

(51) Int. Cl.
*G06T 19/00* (2011.01)
*G02B 27/01* (2006.01)
*H04N 13/383* (2018.01)
*B60L 3/00* (2019.01)
*B60L 58/18* (2019.01)
*G05D 1/02* (2020.01)
*G06F 3/01* (2006.01)
*G06T 17/05* (2011.01)

(52) U.S. Cl.
CPC ............ *B60L 3/0046* (2013.01); *B60L 58/18* (2019.02); *B64C 2201/141* (2013.01); *G02B 27/017* (2013.01); *G05D 1/0274* (2013.01); *G05D 1/0297* (2013.01); *G06F 3/011* (2013.01); *G06T 17/05* (2013.01); *G06T 19/006* (2013.01); *H04N 13/383* (2018.05)

(58) Field of Classification Search
CPC .. G08G 5/0039; G08G 5/0034; G08G 5/0013; G08G 5/0008; G08G 5/003; Y02T 10/70; H04N 13/383; G06T 19/006; G06T 17/05; G06F 3/011; G05D 1/0297; G05D 1/0274; G02B 27/017; B64C 2201/141; B64C 39/024; B60L 58/18; B60L 3/0046
See application file for complete search history.

(56) References Cited

U.S. PATENT DOCUMENTS

| | | |
|---|---|---|
| 2010/0240988 A1 | 9/2010 | Varga et al. |
| 2012/0025032 A1 | 2/2012 | Hopdjanian et al. |
| 2013/0162632 A1 | 6/2013 | Varga et al. |
| 2016/0217694 A1 | 7/2016 | Batla et al. |
| 2017/0201738 A1 | 7/2017 | Lacaze et al. |
| 2018/0156770 A1 | 6/2018 | Saez et al. |
| 2019/0103031 A1* | 4/2019 | Evans .................. G08G 5/0091 |
| 2019/0272665 A1* | 9/2019 | X ............................ G06T 15/08 |
| 2019/0289613 A1* | 9/2019 | Fanelli ............... H04B 7/18506 |
| 2019/0325756 A1* | 10/2019 | Cleaver ................ G08G 5/0086 |
| 2021/0118312 A1* | 4/2021 | Takács ................. G08G 5/0013 |

OTHER PUBLICATIONS

Garmin, "HSVT", Jan. 22, 2018 (print date), 2 pages, Retrieved from the internet [URL: https://buy.garmin.com/en-US/US/p/72798].

Garmin, "SVT-Tm for G1000R", Jan. 22, 2018 (print date), 3 pages, Retrieved from the internet [URL: https://buy.garmin.com/en-SG/digital/p/37630].

HERE.com, "HERE supports Baidu with indoor maps", Jan. 16, 2018 (print date), 4 pages, Retrieved from the internet [URL: https://www.here.com/en].

HERE.com, "HERE WeGo", Jan. 16, 2018 (print date), 1 page, Retrieved from the internet [URL: https://wego.here.com].

Honeywell, "Smartview Synthetic Vision System", Jan. 22, 2018 (print date), Retrieved from the internet [URL: https://aerospace.honeywell.com/en/products/safety-and-connectivity/smartview-synthetic-vision-system].

McKenna, "Synthetic Vision Systems", May 1, 2012, 8 pages, Retrieved from the internet [URL: http://www.aviationtoday.com/2012/05/01/synthetic-vision-systems/].

OpenStreetMap, Jan. 16, 2018 (print date), 1 page, Retrieved from the internet [URL: https://www.openstreetmap.org/#map=4/38.01/-95.84].

OpenStreetMap, "OpenStreetMap powers map data on thousands of web sites, mobile apps, and hardware devices", Jan. 16, 2018 (print date), 1 page, Retrieved from the internet [URL: https://www.openstreetmap.org/about].

PrecisionMapper, "Professional Drone Based Mapping and Analytics", Mar. 1, 2017, 5 pages.

* cited by examiner

FLIGHT PLANNING USING OBSTACLE DATA

RELATED APPLICATION

This application is a continuation of U.S. patent application Ser. No. 15/949,855, filed Apr. 10, 2018, which is incorporated herein by reference.

BACKGROUND

Unmanned aerial vehicles (UAVs) are often operated in urban areas. Successful autonomous flight of a UAV through such areas depends on a variety of factors.

DETAILED DESCRIPTION OF PREFERRED EMBODIMENTS

The following detailed description of example implementations refers to the accompanying drawings. The same reference numbers in different drawings can identify the same or similar elements.

Developing flight plans (e.g., for UAVs) that avoid obstacles is becoming increasingly challenging. This is especially so in areas (e.g., urban or heavily populated areas) where obstacles, including static and dynamic ones, are constantly being introduced. Although some government sources (e.g., government authorities, such as the Federal Aviation Administration (FAA) in the U.S., and/or the like) provide information regarding obstacles, the breadth of coverage of such obstacles is often limited (e.g., the obstacles might not include cranes that go up overnight for a temporary construction project, a large flock of birds presently occupying a region of airspace, and/or the like). In addition, the information provided by such sources can quickly become stale, as updates are infrequent.

Some implementations, described herein, include a device (e.g., a UAV management device) that is capable of receiving obstacle data from various sources (e.g., via crowdsourcing, from trusted sources (e.g., government authorities), from third-party sources that maintain one or more private or public repositories of information regarding obstacles, from UAVs that can detect obstacles while in flight and report such obstacles in real-time (or near real-time), and/or the like), and performing one or more actions to cause recommendations (regarding proposed flight plans of UAVs) that are based on the obstacle data to be provided (e.g., to adjust, in real-time (or near real-time), flight paths of UAVs that are already in flight, to configure mission planning systems associated with UAVs (e.g., pre-flight), and/or the like). In this way, the device can maintain and leverage a large repository of static and/or dynamic obstacles for use with flight plans relating to and/or routing of UAVs, which decreases a risk of collision of a UAV during flight (thereby increasing a success rate of the flight and improving the safety of the UAV and others (e.g., other UAVs, pedestrians, and/or the like) that might be in or near the flight path of the UAV). In addition, this reduces or eliminates a need for a UAV to include certain sensors that would otherwise be needed to detect obstacles during a flight, which reduces the cost of the UAV (including costs associated with the design, manufacture, and testing of the UAV), and conserves power, processing, and memory resources of the UAV associated with the use of such sensors.

Figure 1A:
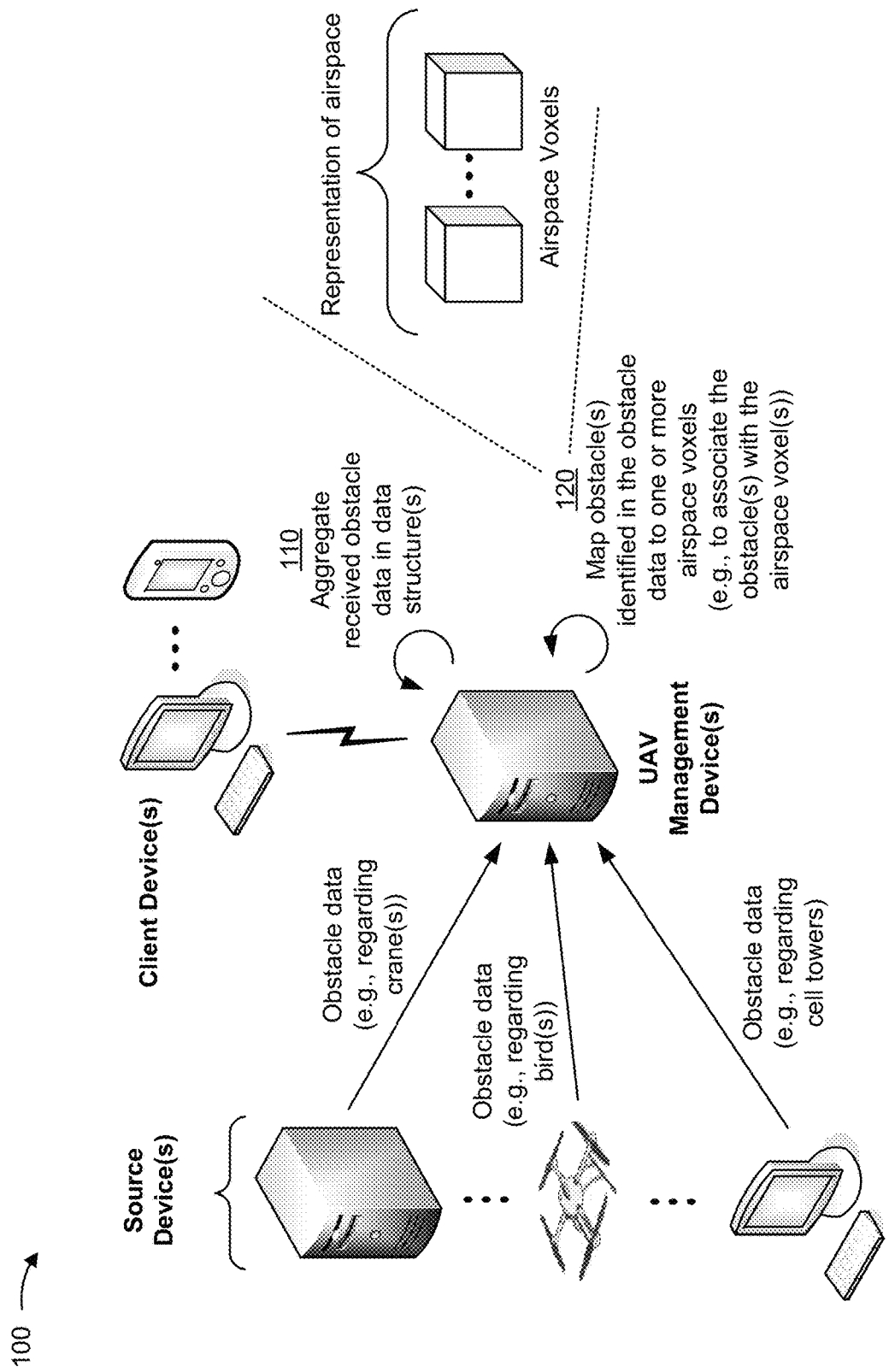
FIGS. 1A-1C are diagrams of an overview of an example implementation described herein.
Figure 1B:
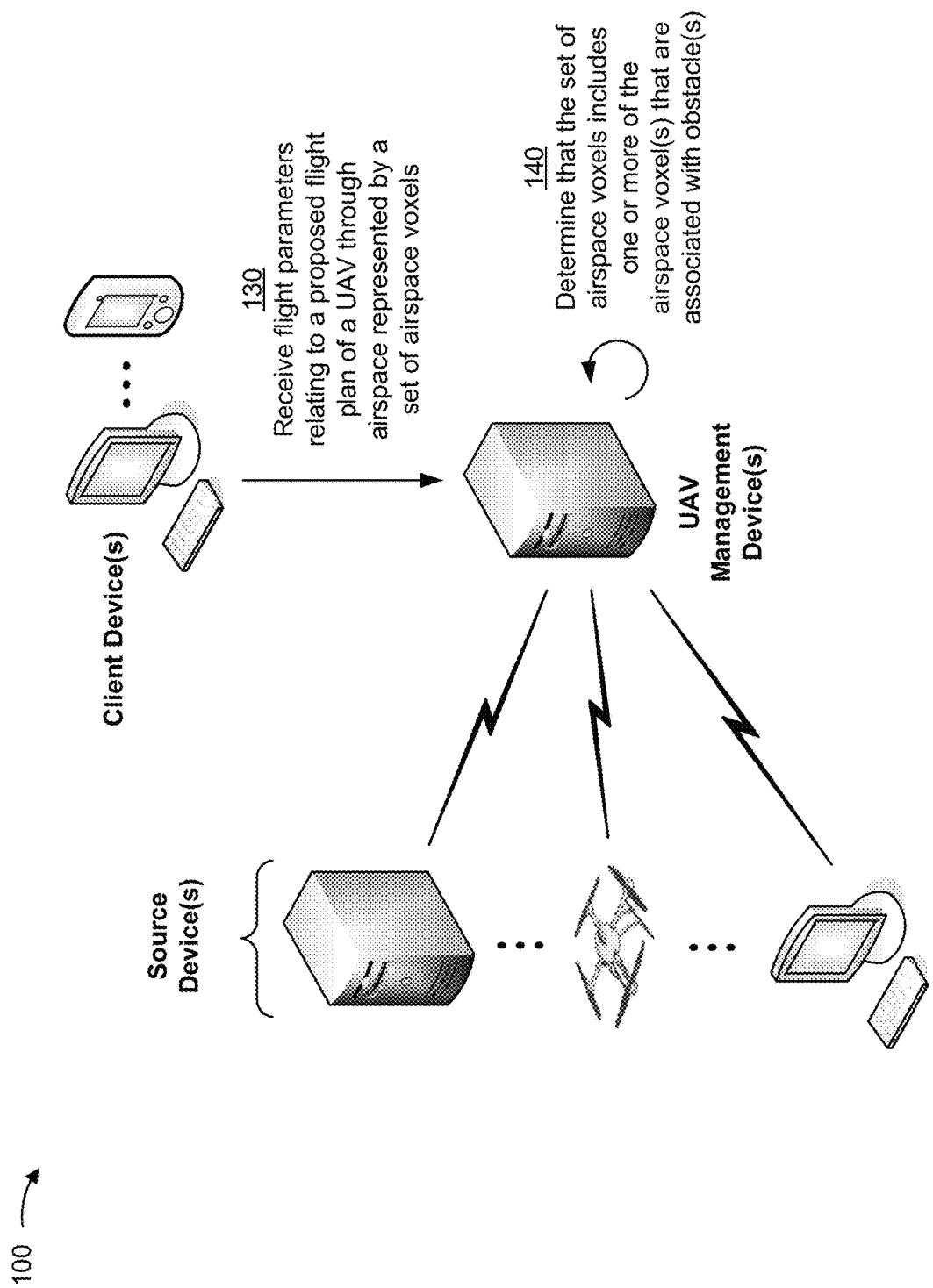
Figure 1C:
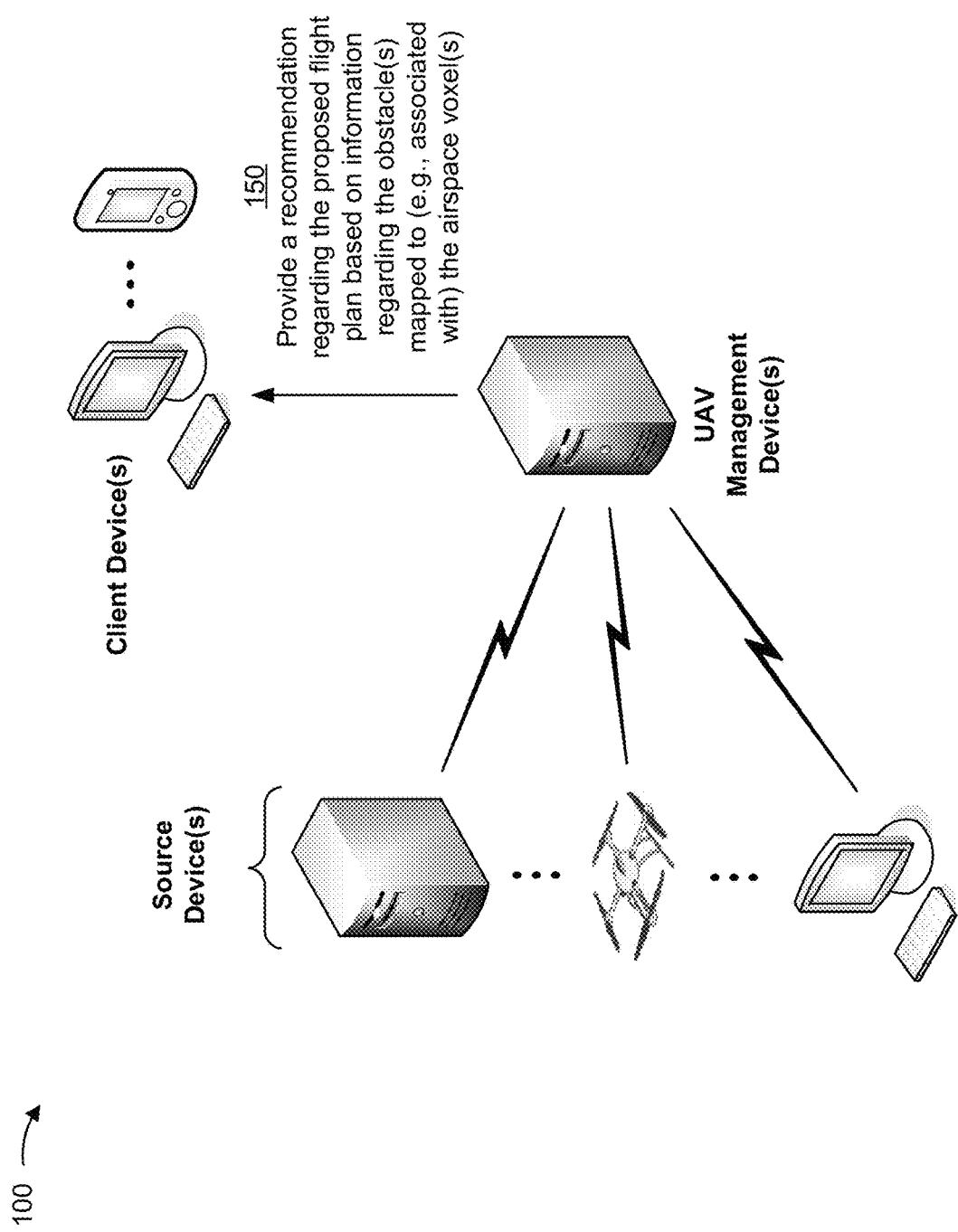

FIGS. 1A-1C are diagrams of an overview of an example implementation 100 described herein. As shown in FIGS. 1A-1C, example implementation 100 can include a UAV management device (e.g., implemented as one or more devices, such as one or more server devices) that is in communication with client devices (e.g., regarding proposed flight plans and/or the like) and source devices. The UAV management device can additionally communicate with one or more UAVs (e.g., UAV(s) that are in flight or are preparing for flight). In some implementations, the UAV management device can include an airspace control system (e.g., an unmanned aircraft traffic management system (UTM)) that is capable of receiving and processing airspace access requests and providing notifications regarding such requests.

As shown in FIG. 1A, the UAV management device can receive obstacle data from the source devices (e.g., periodically, continuously, in real-time (or near real-time) as obstacles are detected by the source devices (or as information regarding obstacles is obtained by the source devices), and/or the like). As shown by reference number 110, the UAV management device can aggregate the obstacle data in one or more data structures (e.g., database(s), linked list(s), array(s), table(s), trie(s), and/or the like).

In some implementations, the obstacle data can include information regarding one or more obstacles (e.g., construction equipment (e.g., cranes), scaffolding, ladders, buildings, cell towers, flying object(s), such as birds, and/or the like) that might interfere with the flight of a UAV. In some implementations, the information can include information regarding a location (e.g., location data, such as global positioning system (GPS) coordinates, a street address, elevation information, and/or the like) of an obstacle, information regarding a size (e.g., a length, a width, a height, an area, a volume, and/or the like) of an obstacle, time stamp(s) associated with the obstacle (e.g., a time stamp indicating a time when the obstacle came into existence at a location, a time stamp indicating a duration that the obstacle will remain in existence at the location, and/or the like), a speed and/or a heading of an obstacle (e.g., in a case where the obstacle is in motion, such as a bird or another flying object), and/or the like.

In some implementations, the source devices can be associated with different types of sources. As one example, a source can include a trusted source—e.g., a government-related source (such as a government authority or regulator (e.g., the FAA, a local/municipal authority, and/or the like)), a map provider (e.g., a local map provider), and/or the like. Additionally, or alternatively, and as another example, a source can include a third-party source or entity (e.g., an individual, a group of individuals, an association, an organization, a corporation, and/or the like) that maintains one or more private or public repositories of obstacle data. Additionally, or alternatively, and as yet another example, the UAV management device can receive obstacle data via crowdsourcing, such as from one or more users that are associated with the UAV management device (e.g., subscribers to one or more UAV-related services provided by the UAV management device) and/or the like. Additionally, or alternatively, and as a further example, a source can include a UAV that can detect obstacles (e.g., while in flight) using onboard sensors and/or sensors associated with the UAV (e.g., infrared sensor(s), near infrared camera(s), radar system(s), light detection and ranging (LIDAR) system(s), biological sensor(s), temperature sensor(s), chemical sensor(s), humidity sensor(s), and/or the like), and provide information regarding such obstacles (e.g., in real-time (or near real-time), during a flight, and/or after a flight).

As further shown in FIG. 1A, and by reference number 120, the UAV management device can map obstacle(s) identified in the obstacle data to one or more airspace voxels (e.g., to associate the obstacle(s) with the one or more airspace voxels) that represent one or more three-dimensional (3D) portions of airspace. In some implementations, the UAV management device can generate the airspace voxel(s) to each define a portion of 3D airspace, and map the obstacle(s) to the airspace voxel(s) based on information regarding the obstacle(s) (e.g., based on information regarding the location(s), the size(s), etc. of the obstacle(s)).

As shown in FIG. 1B, and by reference number 130, the UAV management device can receive flight parameters relating to a proposed flight plan of a UAV through airspace represented by a set of airspace voxels. The proposed flight plan can include departure location(s), arrival location(s), information associated with the set of airspace voxels, and/or the like. In some implementations, a flight parameter can include aircraft or UAV parameters (e.g., specifications, payload information, airworthiness information, noise information, etc.), pilot parameters (e.g., registration information, qualification information, etc.) (where applicable), analysis parameters relating to entity preferences (e.g., preferences regarding risk tolerance, cost tolerance, time tolerance, network tolerance, etc. associated with an owner of the UAV, a pilot (if any) of the UAV, and/or the like), and/or the like.

As further shown in FIG. 1B, and by reference number 140, the UAV management device can determine that the set of airspace voxels associated with the proposed flight plan includes one or more of the airspace voxel(s) that are associated with obstacle(s). In some implementations, the UAV management device can determine that the set of airspace voxels includes the one or more airspace voxels that are associated with obstacle(s) by determining coordinate information associated with the set of airspace voxels (e.g., based on a flight path relating to the flight parameters), and comparing this coordinate information and coordinate information associated with the one or more airspace voxels that are associated with obstacle(s) to identify matches. In a case where the UAV management device identifies one or more matching airspace voxels, the UAV management device can determine that the set of airspace voxels associated with the proposed flight plan includes airspace voxel(s) that are associated with obstacle(s).

In some implementations, the UAV management device can treat one or more airspace voxels, adjacent to an airspace voxel that is associated with obstacle(s), as additionally being associated with the obstacle(s), and utilize the coordinate information associated with such adjacent airspace voxel(s) in the coordinate information comparison described above. This can, for example, serve as a buffer that accounts for the possibility that obstacle(s) might shift in position over time, and that accommodates UAVs that might have navigation systems that operate at lower resolutions.

As shown in FIG. 1C, and by reference number 150, the UAV management device can provide a recommendation regarding the proposed flight plan based on information regarding the obstacle(s) mapped to (e.g., associated with) the airspace voxel(s). In a case where the UAV management device receives the flight parameters from a client device associated with the UAV, the UAV management device can provide the recommendation to the client device. In a case where the UAV management device receives the flight parameters from the UAV, the UAV management device can provide the recommendation to the UAV. In some implementations, the recommendation can include a recommended flight plan. In some implementations, the recommended flight plan can include an adjustment to the proposed flight plan—e.g., such that the UAV can avoid passing through any portion of airspace represented by the airspace voxel(s). In some implementations, the UAV management device can associate flight plan information, relating to other UAVs, with one or more airspace voxels. In such cases, the UAV management device may provide a recommendation regarding a proposed flight plan of a particular UAV and/or control the particular UAV's flight path (e.g., via rerouting and/or the like) based on the flight plan information associated with the one or more airspace voxels.

In some implementations, the UAV management device can generate and/or provide a recommended flight plan that satisfies requirement(s) (e.g., specified by an entity, such as an owner of the UAV, a pilot (if any) of the UAV, and/or the like) relating to the flight parameters and/or any analysis parameters, such as risk tolerance, cost tolerance, and/or the like (e.g., such that a probability of successful (e.g., safe and/or reliable) flight associated with the flight plan satisfies a threshold probability (e.g., is greater than or equal to "five nines" (99.999%), "six nines" (99.9999%), "seven nines" (99.99999%) and/or the like). In such cases, the UAV management device can generate and/or provide the recommended flight plan based on one or more factors associated with the obstacle(s), including for example, a rating or weighting associated with the obstacle(s) (e.g., a measure of reliability and/or accuracy of the information regarding the obstacle(s)) and/or the like described elsewhere herein. Additionally, or alternatively, and in some implementations, the UAV management device can provide the one or more factors associated with the obstacle(s) to the client device that the client device and/or an entity (such as an owner of the UAV, a pilot (if any) of the UAV, and/or the like) associated with the client device can utilize to develop one or more flight plans that satisfy the requirement(s).

In some implementations, the UAV management device can perform one or more actions to cause 3D representations or models of the obstacle(s) to be provided to a client device (e.g., during a flight planning stage relating to the UAV) for display on a user interface (e.g., on an interactive 3D map) presented on the client device. Additionally, or alternatively, the UAV management device can provide two-dimensional representations or models of the obstacle(s) (e.g., with corresponding height information relating to the obstacle(s)) for display.

In some implementations, a UAV can, while in flight, provide flight parameters and/or submit one or more queries to the UAV management device for information regarding any upcoming obstacle(s) that might be located in or near the flight path of the UAV. In such cases, the UAV management device can process the flight parameters and/or queries (e.g., to determine a current location of the UAV, the flight path of the UAV, and/or the like), identify any obstacle(s) that might interfere with the flight of the UAV (e.g., by identifying airspace voxels that are associated with obstacle(s), etc.), and perform one or more actions to cause information regarding such obstacle(s) to be provided to the UAV, one or more actions to determine and provide a recommended adjustment to a flight plan or flight path of the UAV based on the information regarding such obstacle(s), one or more actions to control the UAV to adjust the flight path of the UAV based on the information regarding such obstacle(s), and/or the like. In a case where the UAV management device performs one or more actions to cause the information regarding obstacle(s) and/or the recommended adjustment to be provided to the UAV, the UAV can perform (e.g., autonomously, using a flight control system and/or the like) one or more maneuvers (e.g., by moving vertically and/or horizontally as appropriate) based on the information and/or the recommended adjustment to avoid passing through any portion of the airspace that is represented by airspace voxel(s) associated with obstacle(s). In a case where the UAV management device performs one or more actions to control the UAV to adjust the flight path of the UAV, the UAV management device can cause one or more instructions to be provided to the UAV to control a flight control system of the UAV to perform the one or more maneuvers.

Additionally, or alternatively, and in some implementations, the UAV management device can provide obstacle data (e.g., a subset of the obstacle data or all of the obstacle data) to a UAV for onboard storage (e.g., in one or more caches of the UAV). In such cases, the UAV can access and utilize the obstacle data, while in flight, to adjust the flight path of the UAV to avoid passing through any portion of the airspace that is represented by airspace voxel(s) associated with obstacle(s).

In this way, the UAV management device can maintain and leverage a large repository of static and/or dynamic obstacles for use with flight plans relating to and/or routing of UAVs, which decreases a risk of collision of a UAV during flight (thereby increasing a success rate of the flight and improving the safety of the UAV and others (e.g., other UAVs, pedestrians, and/or the like) that might be in or near the flight path of the UAV). In addition, this reduces or eliminates a need for a UAV to include certain sensors that would otherwise be needed to detect obstacles during a flight, which reduces the cost of the UAV (including costs associated with the design, manufacture, and testing of the UAV), and conserves power, processing, and memory resources of the UAV associated with the use of such sensors.

As indicated above, FIGS. 1A-1C are provided merely as examples. Other examples are possible and can differ from what was described with regard to FIGS. 1A-1C.

Figure 2:
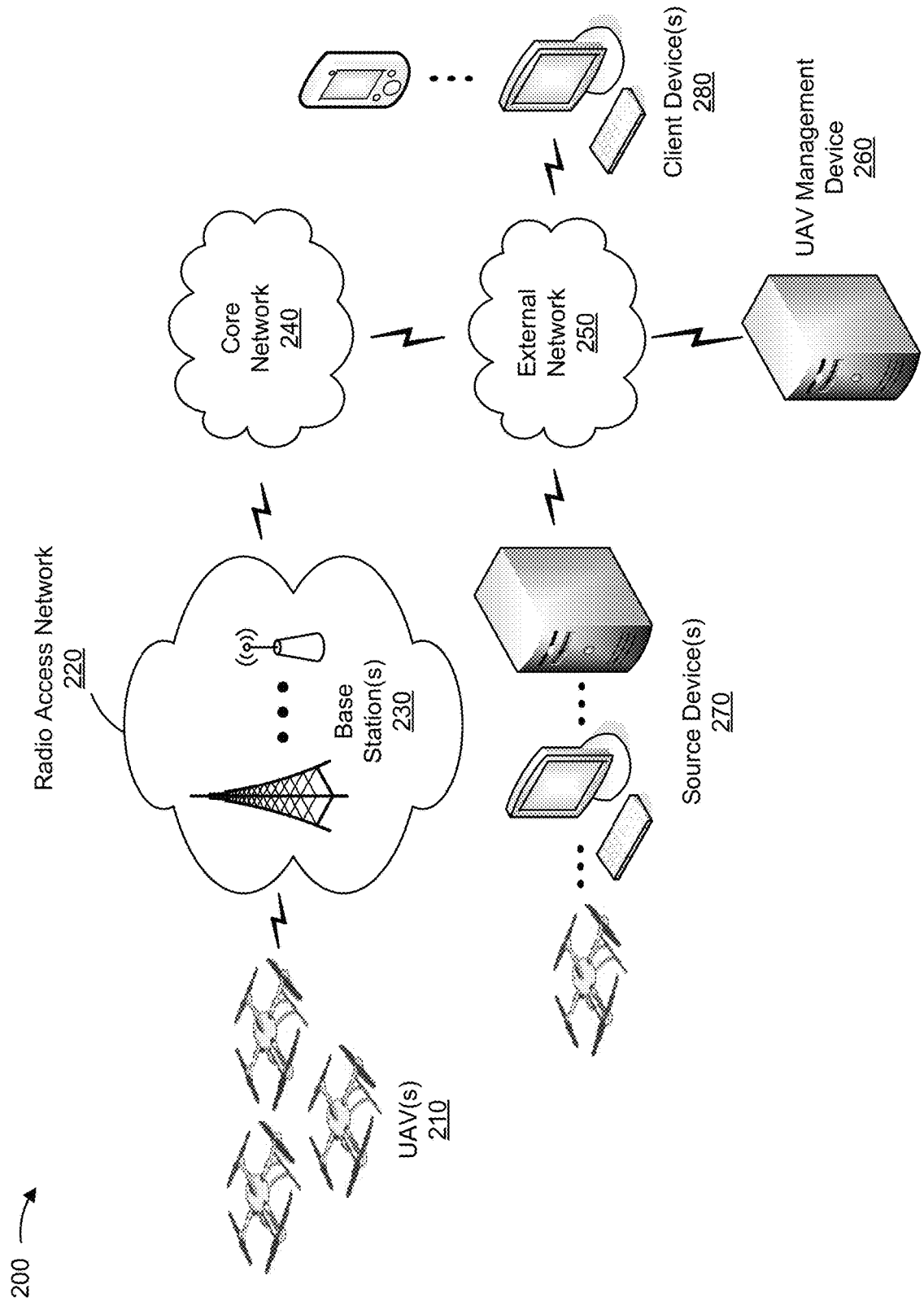
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include one or more unmanned aerial vehicles (UAVs) 210 (hereinafter referred to individually as "UAV 210," and collectively as "UAVs 210"), a radio access network (RAN) 220, one or more base stations 230 (hereinafter referred to individually as "base station 230," and collectively as "base stations 230"), a core network 240, an external network 250, a UAV management device 260, one or more source devices 270 (hereinafter referred to individually as "source device 270," and collectively as "source devices 270"), and one or more client devices 280 (hereinafter referred to individually as "client device 280," and collectively as "client devices 280"). Devices of environment 200 can interconnect via wired connections, wireless connections, or a combination of wired and wireless connections.

UAV 210 includes an aircraft without a human pilot aboard, and can also be referred to as an unmanned aircraft (UA), a drone, a remotely piloted vehicle (RPV), a remotely piloted aircraft (RPA), or a remotely operated aircraft (ROA). UAV 210 can have a variety of shapes, sizes, configurations, characteristics, etc. for a variety of purposes and applications. In some implementations, UAV 210 can include one or more sensors, such as an electromagnetic spectrum sensor (e.g., visual spectrum, infrared, or near infrared cameras, radar systems, etc.), a biological sensor, a temperature sensor, a chemical sensor, and/or the like. In some implementations, UAV 210 can include one or more components for communicating with one or more base stations 230. Additionally, or alternatively, UAV 210 can transmit information to and/or can receive information from UAV management device 260, such as sensor data, flight plan information, and/or the like. Such information can be communicated via base stations 230, core network 240, and/or external network 250.

RAN 220 includes one or more radio access networks such as, for example, a code division multiple access (CDMA) RAN, a time division multiple access (TDMA) RAN, a frequency division multiple access (FDMA) RAN, a universal terrestrial radio access network (UTRAN), an evolved UTRAN (E-UTRAN) (e.g., a long-term evolution (LTE) RAN, an LTE-Advanced (LTE-A) RAN, an LTE-unlicensed (LTE-U) RAN, etc.), and/or the like. RAN 220 can include one or more base stations 230 that provide access for UAVs 210 to core network 240.

Base station 230 includes one or more devices capable of transferring traffic, such as audio, video, text, and/or other traffic, destined for and/or received from UAV 210. In some implementations, base station 230 can include an evolved NodeB (eNB) associated with an LTE RAN that receives traffic from and/or sends traffic to UAV management device 260 and/or client devices 280 via core network 240. Additionally, or alternatively, one or more base stations 230 can be associated with a RAN that is not associated with the LTE network. Base station 230 can send traffic to and/or receive traffic from UAV 210 via an air interface. Base stations 230 can include different types of base stations, such as a macro cell base station or a small cell base station (e.g., a micro cell base station, a pico cell base station, and/or a femto cell base station). A macro cell base station can cover a relatively large geographic area (e.g., several kilometers in radius). A small cell base station can be a lower-powered base station, as compared with a macro cell base station, that can operate in the same or different (e.g., licensed, unlicensed, etc.) frequency bands as macro cell base stations.

Core network 240 includes a network that enables communications between RAN 220 (e.g., base stations 230) and one or more devices and/or networks connected to core network 240. For example, core network 240 can include an evolved packet core (EPC). Core network 240 can include one or more mobility management entities (MMEs), one or more serving gateways (SGWs), and one or more packet data network gateways (PGWs) that together provide mobility functions for UAVs 210 and enable UAVs 210 to communicate with other devices of environment 200.

External network 250 includes one or more wired and/or wireless networks. For example, external network 250 can include a cellular network (e.g., an LTE network, a CDMA network, a 3G network, a 4G network, a 5G network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

UAV management device 260 includes one or more devices capable of managing UAVs 210 and/or flight plans for UAVs 210. For example, UAV management device 260 can include a server device, a desktop computer, a laptop computer, or a similar device. In some implementations, UAV management device 260 can communicate with one or more devices of environment 200 (e.g., UAV 210, source devices 270, client devices 280, etc.) to receive information regarding flight plans for UAVs 210 and/or to provide recommendations associated with such flight plans, as described elsewhere herein. In some implementations, UAV management device 260 can permit a user of a client device 280 to control UAVs 210 via UAV management device 260. In some implementations, UAV management device 260 can be included in a data center, a cloud computing environment, a server farm, and/or the like, which can include multiple UAV management devices 260. While shown as being external from core network 240, in some implementations, UAV management device 260 can reside within core network 240.

Source device 270 includes one or more devices capable of receiving, storing, processing, and/or providing information or data. For example, source device 270 can include a server device (e.g., in a data center, a cloud computing environment, etc.), a client device (e.g., a client device 280), a UAV (e.g., a UAV 210), and/or the like. In some implementations, source device 270 can provide obstacle data relating to obstacles, as described elsewhere herein. Additionally, in some implementations, source device 270 can provide regulatory information, weather information, flight plan information, and/or the like.

Client device 280 includes one or more devices capable of receiving, storing, processing, and/or providing information associated with UAV 210 and/or UAV management device 260. For example, client device 280 can include a desktop computer, a laptop computer, a tablet computer, a mobile phone, or a similar device. In some implementations, a user can interact with client device 280 to request a flight plan analysis and/or recommendation, for a UAV 210, from UAV management device 260, as described elsewhere herein.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
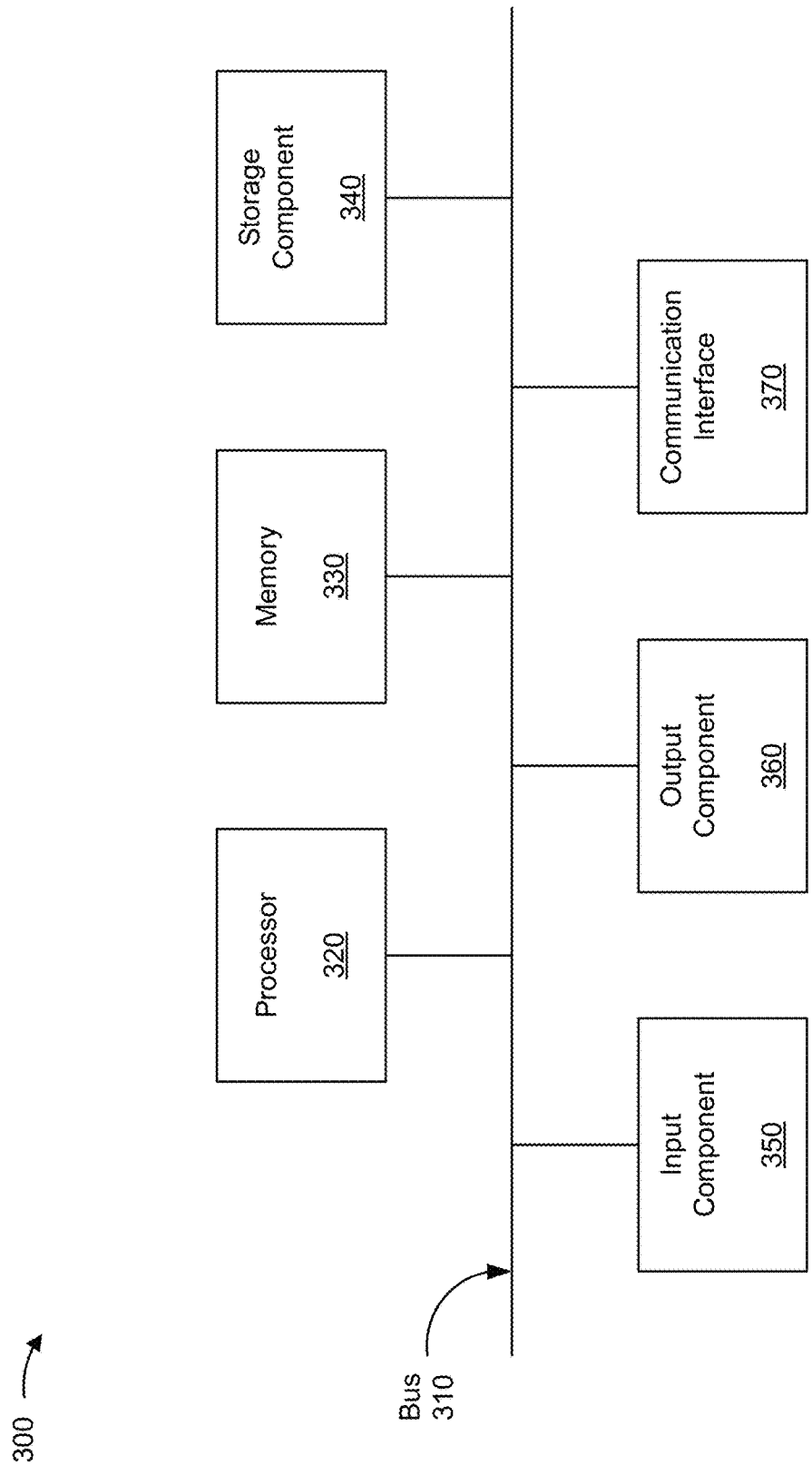
FIG. 3 is a diagram of example components of one or more devices of FIG. 2.

FIG. 3 is a diagram of example components of a device 300. Device 300 can correspond to UAV 210, base station 230, UAV management device 260, source device 270, and/or client device 280. In some implementations, UAV 210, base station 230, UAV management device 260, source device 270, and/or client device 280 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor, a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a GPS component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, and/or the like.

Device 300 can perform one or more processes described herein. Device 300 can perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
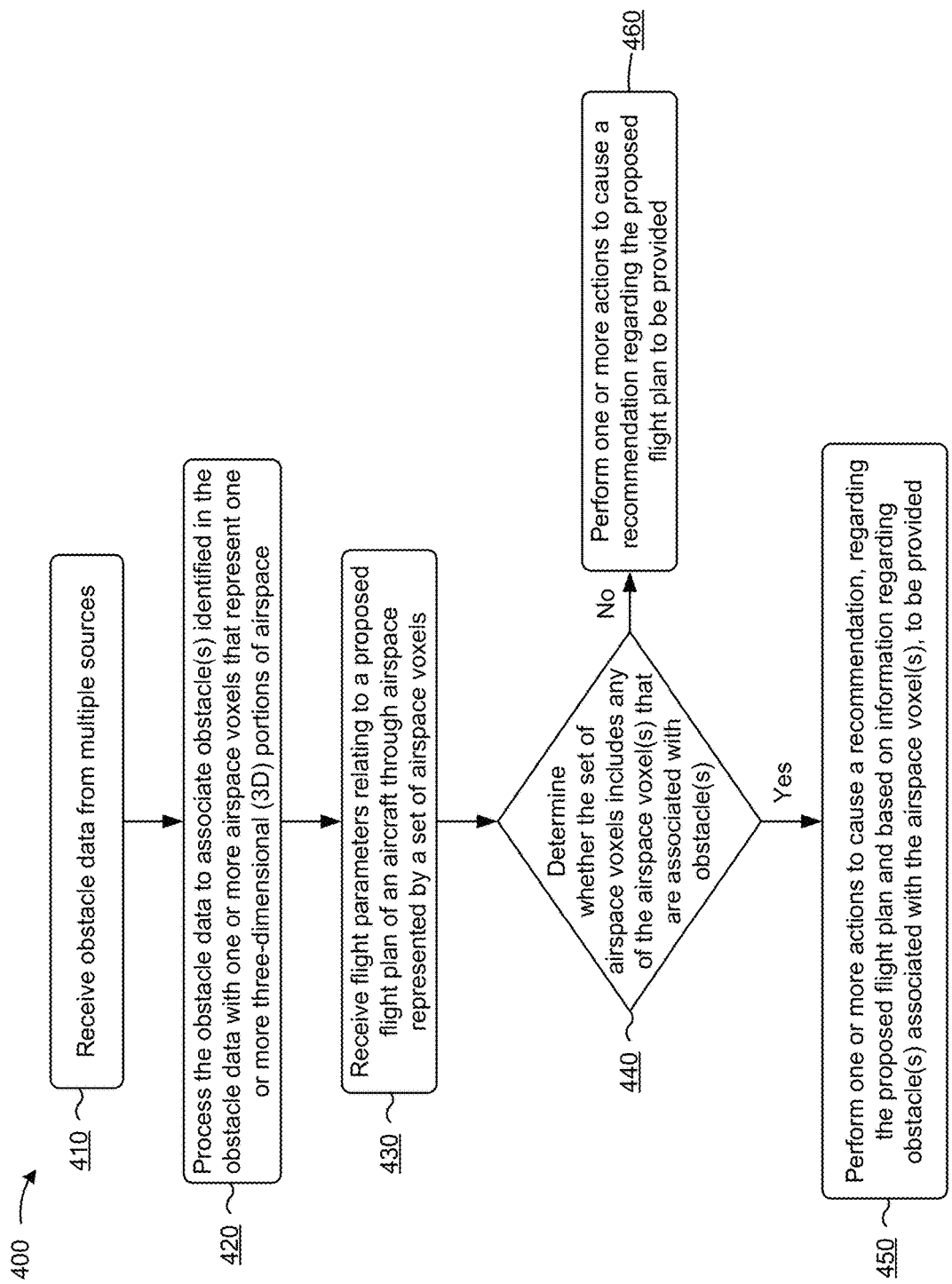
FIG. 4 is a flow chart of an example process for flight plan recommendation based on obstacle data.

FIG. 4 is a flow chart of an example process 400 for flight plan recommendation based on obstacle data. In some implementations, one or more process blocks of FIG. 4 can be performed by UAV management device 260. In some implementations, one or more process blocks of FIG. 4 can be performed by another device or a group of devices separate from or including UAV management device 260, such as UAV 210, base station 230, source device 270, and/or client device 280.

As shown in FIG. 4, process 400 can include receiving obstacle data from multiple sources (block 410). For example, UAV management device 260 can receive (e.g., using processor 320, memory 330, storage component 340, communication interface 370, and/or the like) the obstacle data from source devices 270 via external network 250. In practice, UAV management device 260 can receive thousands, millions, billions, etc. of sets of obstacle data from hundreds, thousands, etc. of source devices 270. In this way, UAV management device 260 can receive sets of obstacle data in a manner that cannot be performed manually or objectively by a human actor.

In some implementations, the obstacle data can include information regarding one or more obstacles (e.g., construction equipment (e.g., cranes), scaffolding, ladders, buildings, cell towers, flying object(s), such as birds, and/or the like) that might interfere with the flight of a UAV (e.g., UAV 210), such as information regarding location(s) and size(s) of the obstacle(s), time stamp(s) associated with the obstacle(s), and/or the like, as described elsewhere herein (e.g., with respect to FIGS. 1A-1C).

In some implementations, the sources can include different types of sources. For example, a source can include a trusted source—e.g., a government-related source (such as a government authority or regulator (e.g., the FAA, a local/municipal authority, and/or the like)), a map provider (e.g., a local map provider), and/or the like. Continuing the example, a local regulator can provide information regarding cranes and/or other like objects for which the local regulator has granted permission to be placed and/or operated at one or more designated locations. Additionally, or alternatively, and as another example, a source can include a third-party source or entity (e.g., an individual, a group of individuals, an association, an organization, a corporation, and/or the like) that maintains one or more private or public repositories of obstacle data. Additionally, or alternatively, and as yet another example, UAV management device 260 can receive obstacle data via crowdsourcing, such as from one or more users that are associated with UAV management device 260 (e.g., subscribers of one or more UAV-related services provided by UAV management device 260) and/or the like. Additionally, or alternatively, and as a further example, a source can include a UAV (e.g., a UAV 210) that can detect obstacles (e.g., while in flight) using onboard sensors and/or sensors associated with the UAV (e.g., infrared sensor(s), near infrared camera(s), radar system(s), LIDAR system(s), biological sensor(s), temperature sensor(s), chemical sensor(s), humidity sensor(s), and/or the like), and provide information regarding such obstacles (e.g., in real-time (or near real-time), during a flight, and/or after a flight).

In some implementations, UAV management device 260 can aggregate the obstacle data in one or more data structures (e.g., database(s), linked list(s), array(s), table(s), trie(s), and/or the like). In some implementations, the data structure(s) can be stored in memory of UAV management device 260. Additionally, or alternatively, the data structure(s) can be stored in one or more other devices (e.g., server device(s)) accessible to UAV management device 260 and/or the like).

In some implementations, UAV management device 260 can determine a rating or weighting for information regarding an obstacle, based on the source (e.g., an identity or type of the source) of the information, and associate the rating or weighting with the information, to provide an indication of a measure of reliability and/or accuracy of the information. For example, UAV management device 260 can associate a higher rating with information regarding an obstacle that is obtained from a trusted source than with information regarding an obstacle that is obtained via crowdsourcing (e.g., given that the trusted source might be more authoritative). Alternatively, and as another example, UAV management device 260 can associate a higher rating with information regarding an obstacle that is obtained via crowdsourcing than with information regarding an obstacle that is obtained from a trusted source (e.g., given that crowdsourced information might be more current (e.g., "fresh")). As another example, UAV management device 260 can associate a high rating with information regarding an obstacle that is obtained from a UAV in flight (e.g., given that obstacle detection by a UAV might be highly reliable).

In some implementations, UAV management device 260 can associate a rating with information regarding an obstacle based on validation of an accuracy of the information (e.g., validation by one or more trusted users, parties, and/or the like), based on a quantity of sources that identify the obstacle (e.g., based on how many sources are reporting the obstacle), based on how current the information is (e.g., information that is more current might be more reliable than information that is less current), based on a type of the obstacle (e.g., information regarding obstacles that are in motion (e.g., bird(s)) might become stale more quickly than information regarding construction equipment (e.g., cranes)), based on any combination thereof, and/or the like. In some implementations, UAV management device 260 can weight one or more ratings associated with an obstacle, and combine the ratings (e.g., based on the weights of the ratings, by averaging the ratings, by taking a maximum of the ratings, and/or the like) to derive an overall rating for the obstacle.

In some implementations, a rating or weighting associated with information regarding an obstacle can influence whether UAV management device 260 utilizes such information. For example, in a case where information regarding an obstacle is associated with a low rating, UAV management device 260 might not utilize such information when determining, generating, and/or providing a recommendation on a proposed flight plan (e.g., given that the information might not be sufficiently reliable). Additionally, or alternatively, and in some implementations, UAV management device 260 can utilize all information regarding all obstacles, regardless of associated ratings (e.g., for the sake of safety).

In this way, UAV management device 260 can receive obstacle data from multiple sources to cause UAV management device 260 to process the obstacle data to associate obstacle(s) identified in the obstacle data with one or more airspace voxels that represent one or more 3D portions of airspace.

As further shown in FIG. 4, process 400 can include processing the obstacle data to associate obstacle(s) identified in the obstacle data with one or more airspace voxels that represent one or more 3D portions of airspace (block 420). For example, UAV management device 260 can process (e.g., using processor 320 and/or the like) the obstacle data to associate obstacle(s) identified in the obstacle data with one or more airspace voxels that represent one or more 3D portions of airspace. In some implementations, UAV management device 260 can associate the obstacle(s) identified in the obstacle data with the one or more airspace voxels based on receipt of the obstacle data and/or other data (e.g., map data, environmental data, and/or the like), based on receipt of a user input, based on receipt of a third-party request, based on an occurrence of a triggering event, and/or the like. In practice, UAV management device 260 can process thousands, millions, billions, etc. of sets of obstacle data. In this way, UAV management device 260 can process obstacle data in a manner that cannot be performed manually or objectively by a human actor.

In some implementations, UAV management device 260 can divide airspace into numerous (e.g., thousands of, millions of, billions of, etc.) airspace voxels. In some implementations, UAV management device 260 can represent each airspace voxel using a group of coordinates (e.g., coordinate information, including latitude information, longitude information, elevation information, and/or the like) that define the dimensions of the airspace voxel. In some implementations, UAV management device 260 can receive airspace voxels as input (e.g., based on an input from a user of a client device, such as client device 280, based on input(s) provided by one or more other devices, such as one or more management devices, and/or the like) and/or generate airspace voxels.

In some implementations, a quantity of airspace voxels managed by UAV management device 260 can vary based on a size of an airspace voxel, a scale of the UAV network managed by UAV management device 260, and/or the like. In some implementations, different UAV management devices 260 can manage UAV traffic at different scales, such as a global voxel scale to manage long-distance flights, a regional voxel scale to manage flights within a particular geographic region, a city-wide scale to manage urban flights, and/or the like.

In some implementations, the shapes and sizes of airspace voxels can vary (e.g., an airspace voxel can be shaped as a hexahedron, a pyramid, and/or another plesiohedra, and can represent a different volume of space based on the position (e.g., coordinates) associated with the airspace voxel). Alternatively, and in some implementations, airspace voxels can have uniform shapes and sizes, such as 3D cubes that are all the same size (e.g., that all represent the same amount of volume of space).

In some implementations, an airspace voxel can be associated with a particular time period. In this way, the same 3D portion of airspace can be associated with different parameters at different times, as conditions in the airspace change. In some implementations, a time period can have different granularities, such as an indefinite period, one or more days, one or more hours, one or more minutes, one or more seconds, and/or the like.

In some implementations, UAV management device 260 can associate the obstacle(s) identified in the obstacle data with the one or more airspace voxels by generating the airspace voxel(s) to each define a portion of 3D airspace, and mapping the obstacle(s) to the airspace voxel(s) based on information regarding the obstacle(s) (e.g., based on information regarding the location(s), the size(s), the elevation, etc. of the obstacle(s)). For example, in a case where an obstacle identified in the obstacle data includes a crane, and information regarding the crane includes information regarding a location of the crane, a size of the crane, and an elevation of the crane, UAV management device 260 can map the crane (e.g., map information regarding the crane) to one or more airspace voxels that correspond to the location of the crane, to the size of the crane, and to the elevation of the crane. In some implementations, UAV management device 260 can generate the one or more airspace voxels in a manner designed to represent at least a portion of the obstacle data in a grid of 3D voxels that each represents a portion of 3D space.

In some implementations, UAV management device 260 can include a variety of types of data in an airspace voxel. For example, airspace voxels can include 3D points and data, such as obstacle data, map data, environmental data, and/or the like, associated with each 3D point. By way of example, UAV management device 260 can include, in an airspace voxel corresponding to a geographic location, 3D points associated with obstacles, such as cranes, buildings, and/or the like as well as roads, bodies of water, boundaries of municipalities, municipal zoning sections, terrain, weather condition(s), and/or the like.

In some implementations, 3D points corresponding to information regarding obstacle(s) identified in the obstacle data and/or corresponding to any other data (e.g., map data, etc.) can be represented by an identifier, an equation, and/or the like to reduce the amount of memory needed to store each airspace voxel.

In this way, UAV management device 260 can process the obstacle data to associate obstacle(s) identified in the obstacle data with one or more airspace voxels that represent one or more 3D portions of airspace to cause UAV management device 260 to receive flight parameters relating to a proposed flight plan of a UAV through airspace represented by a set of airspace voxels.

As further shown in FIG. 4, process 400 can include receiving flight parameters relating to a proposed flight plan of a UAV through airspace represented by a set of airspace voxels (block 430). For example, UAV management device 260 can receive (e.g., using processor 320, memory 330, storage component 340, communication interface 370, and/or the like) flight parameters relating to a proposed flight plan of a UAV 210 through airspace represented by a set of airspace voxels. In some implementations, UAV management device 260 can receive the flight parameters from client device 280 via external network 250 and/or from UAV 210 via external network 250, core network 240, and/or one or more base stations 230. In practice, UAV management device 260 can receive thousands, millions, billions, etc. of flight parameters relating to proposed flight plans from hundreds, thousands, etc. of client devices 280 and/or UAVs 210. In this way, UAV management device 260 can receive flight parameters in a manner that cannot be performed manually or objectively by a human actor.

In some implementations, a flight plan can include a departure location (e.g., ground beneath a first airspace voxel), an arrival location (e.g., ground beneath a second airspace voxel), and/or multiple departure locations and arrival locations (e.g., for multiple deliveries of packages). Additionally, or alternatively, a flight plan can include airspace voxels to be traversed by the UAV, an order or sequence in which the airspace voxels are to be traversed, an overall flight time, a flight time per airspace voxel (e.g., an amount of time to spend in an airspace voxel), an overall flight speed, a flight speed per airspace voxel, and/or the like.

In some implementations, a flight parameter can include one or more UAV parameters relating to characteristics of the UAV. For example, a flight parameter can include a size, a weight, or a class of the UAV (e.g., the UAV for which a recommendation is to be generated and/or provided). As another example, a flight parameter can include information that represents an airworthiness of the UAV (e.g., due to maintenance, age, etc.). As yet another example, a flight parameter can include information that represents a payload of the UAV (e.g., a type of payload, an indication of a value or a fragility of the payload, a weight of the payload, sensitivity level of the payload, etc.). As still another example, a flight parameter can include information that represents an amount of noise generated by the UAV (e.g., which can be taken into account for a noise ordinance).

In some implementations, a flight parameter can include one or more pilot parameters relating to characteristics of a pilot of the UAV. For example, the pilot parameters can include information that indicates whether the pilot is registered to pilot UAVs in certain airspace voxels (e.g., as per local government regulations). As another example, the pilot parameters can include information that represents qualifications of the pilot, experience of the pilot (e.g., a quantity of flights conducted, a quantity of years as a pilot, etc.), a type of pilot's license obtained by the pilot, and/or the like.

In some implementations, a flight parameter can include one or more analysis parameters relating to a preference of an entity associated with the UAV (e.g., an owner of the UAV, a pilot of the UAV, etc.). For example, the analysis parameters can include information that represents a risk tolerance associated with the UAV or the potential flight plan (e.g., low cost drones or payloads can have a higher risk tolerance for potential accidents than high cost drones or payloads). As another example, the analysis parameters can include information that represents a cost tolerance associated with the UAV or the potential flight plan (e.g., certain flight plans can require more expensive pilots, can require more expensive licenses, etc.). As yet another example, the analysis parameters can include information that represents a time tolerance associated with the UAV or the potential flight plan (e.g., the entity can have a total flight time requirement from departure to arrival). As yet another example, the analysis parameters can include information that represents a network tolerance associated with the UAV or the potential flight plan (e.g., a system or network with infrastructure that supports flight operations can have thresholds associated with cost to the system or network, risk to the system or network, time factors associated with the system or network, etc.).

In this way, UAV management device 260 can receive flight parameters relating to a proposed flight plan of a UAV through airspace represented by a set of airspace voxels to cause UAV management device 260 to determine whether the set of airspace voxels includes any of the one or more airspace voxels that are associated with obstacle(s).

As further shown in FIG. 4, process 400 can include determining whether the set of airspace voxels includes any of the one or more airspace voxels that are associated with obstacle(s) (block 440). For example, UAV management device 260 can determine (e.g., using processor 320, memory 330, storage component 340, and/or the like) whether the set of airspace voxels includes any of the one or more airspace voxels that are associated with obstacle(s). In practice, UAV management device 260 can perform thousands, millions, billions, etc. of determinations regarding airspace voxels. In this way, UAV management device 260 can perform determinations regarding airspace voxels in a manner that cannot be performed manually or objectively by a human actor.

In some implementations, UAV management device 260 can determine that the set of airspace voxels includes the one or more airspace voxels that are associated with obstacle(s) by determining coordinate information associated with the set of airspace voxels (e.g., based on a flight path relating to the flight parameters), and comparing this coordinate information and coordinate information associated with the one or more airspace voxels that are associated with obstacle(s) to identify matches. In a case where UAV management device 260 identifies one or more matching airspace voxels, UAV management device 260 can determine that the set of airspace voxels associated with the proposed flight plan includes airspace voxel(s) that are associated with obstacle(s).

In this way, UAV management device 260 can determine whether the set of airspace voxels includes any of the one or more airspace voxels that are associated with obstacle(s) to cause UAV management device 260 to perform one or more actions to cause a recommendation regarding the proposed flight plan to be provided, or to perform one or more actions to cause a recommendation, regarding the proposed flight plan and based on information regarding the obstacle(s), to be provided.

As further shown in FIG. 4, if the set of airspace voxels includes any of the one or more airspace voxels that are associated with obstacle(s) (block 440—YES), process 400 can include performing one or more actions to cause a recommendation, regarding the proposed flight plan and based on information regarding the obstacle(s), to be provided (block 450). For example, UAV management device 260 can perform one or more actions (e.g., using processor 320, memory 330, storage component 340, communication interface 370, and/or the like) to cause a recommendation, regarding the proposed flight plan and based on information regarding the obstacle(s), to be provided to client device 280 via external network 250 and/or to UAV 210 via external network 250, core network 240, and/or one or more base stations 230. In practice, UAV management device 260 can perform thousands, millions, billions, etc. of actions with regard to flight plans associated with hundreds, thousands, etc. of client devices 280 and/or UAVs 210. In this way, UAV management device 260 can perform actions with regard to flight plans in a manner that cannot be performed manually or objectively by a human actor.

In some implementations, UAV management device 260 can use airspace rules, such as global rules that apply to all UAVs (e.g., government regulations), individual UAV rules that apply to a particular UAV 210, group UAV rules that apply to a group of UAVs 210 (e.g., UAVs owned by the same owner, UAVs that are of the same class, etc.), pilot rules that apply to a particular pilot or to a particular type of pilot's license, and/or the like to analyze the flight parameters, the airspace voxel(s) that are associated with obstacle(s) and that are included in the set of airspace voxels, and/or various airspace parameter(s) of airspace voxels associated with the proposed flight plan, and generate and/or cause a recommendation to be provided based on the analysis.

In some implementations, an airspace parameter can represent a condition relating to flight through an airspace voxel (e.g., during a particular time period), such as a regulatory condition (e.g., a flight restriction, a zoning law, a noise ordinance, a privacy ordinance, etc.), an environment condition (e.g., a weather condition), an airspace voxel occupancy condition (e.g., whether another UAV will be located in the airspace voxel during a time period, a quantity of UAVs that will be located in the airspace voxel during a time period, a size of one or more of such UAVs, a weight of one or more of such UAVs, a class of one or more of such UAVs, etc.), and/or the like.

In some implementations, UAV management device 260 can generate score(s) for a proposed flight plan that take into account one or more of a risk factor (e.g., a potential for collision or accident), a cost factor (e.g., energy consumption), a time factor (e.g., a time of travel), a network factor (e.g., a risk, cost, or time factor to a network operator with infrastructure that supports flight operations), and/or the like. In some implementations, UAV management device 260 can apply different weights to different factors based on preferences of an entity associated with the UAV. In some implementations, UAV management device 260 can automatically accept a proposed flight plan if a score satisfies a first threshold. Similarly, in some implementations, UAV management device 260 can automatically reject a proposed flight plan if a score does not satisfy a second threshold.

In some implementations, UAV management device 260 can perform one or more actions to cause the recommendation to be provided to client device 280 (e.g., for use or review by an entity associated with UAV 210, such as a pilot of UAV 210, an owner of UAV 210, a shipper utilizing the services of UAV 210, etc.). In some implementations, the recommendation can include a recommendation of whether to approve or reject the proposed flight plan. In this case, the entity can interact with client device 280 to provide input on whether to approve or reject the recommendation, and can provide that information to UAV management device 260. In some implementations, UAV management device 260 can utilize this user input as feedback for a machine learning algorithm, and to automate future decisions based on machine learning (e.g., for the entity, for similar entities, and/or for other entities).

In some implementations, the recommendation can include a recommended flight plan. In some implementations, UAV management device 260 can determine the recommended flight plan based on the analyses and score(s) described above. Additionally, or alternatively, and in some implementations, UAV management device 260 can determine a recommended flight plan that satisfies flight-related requirement(s), as described elsewhere herein (e.g., with respect to FIGS. 1A-1C above).

In some implementations, the recommended flight plan can include an adjustment to the proposed flight plan, as described elsewhere herein (e.g., with respect to FIGS. 1A-1C above).

In some implementations, UAV management device 260 can perform one or more actions to cause information regarding the obstacle(s) to be provided to a client device (e.g., a client device 280) for display, as described elsewhere herein (e.g., with respect to FIGS. 1A-1C above).

In some implementations, UAV management device 260 can perform one or more actions to cause information regarding the obstacle(s) to be provided to a UAV (e.g., a UAV 210), while in flight, to control the UAV to adjust, or to recommend that the UAV adjust (e.g., autonomously), the flight path of the UAV.

In this way, UAV management device 260 can perform one or more actions to cause a recommendation, regarding the proposed flight plan and based on information regarding the obstacle(s), to be provided.

As further shown in FIG. 4, if the set of airspace voxels does not include any of the one or more airspace voxels that are associated with obstacle(s) (block 440—NO), process 400 can include performing one or more actions to cause a recommendation regarding the proposed flight plan to be provided (block 460). For example, UAV management device 260 can perform one or more actions (e.g., using processor 320, memory 330, storage component 340, communication interface 370, and/or the like) to cause a recommendation regarding the proposed flight plan to be provided to client device 280 via external network 250 and/or to UAV 210 via external network 250, core network 240, and/or one or more base stations 230. In practice, UAV management device 260 can perform thousands, millions, billions, etc. of actions with regard to flight plans associated with hundreds, thousands, etc. of client devices 280 and/or UAVs 210. In this way, UAV management device 260 can perform actions with regard to flight plans in a manner that cannot be performed manually or objectively by a human actor.

In some implementations, and in a case where UAV management device 260 receives the flight parameters from a client device (e.g., a client device 280) regarding a UAV (e.g., a UAV 210), UAV management device 260 can perform one or more actions to cause a recommendation to be provided to the client device based on the flight parameters (e.g., as described above with respect to block 450), but might not cause any recommendation(s) based on the obstacle data to be provided. In some implementations, UAV management device 260 can, despite the set of airspace voxels not including any of the one or more airspace voxels that are associated with obstacle(s), nevertheless cause some or all of the information regarding the obstacle(s) to be provided to the client device (e.g., for display as 3D representation(s) or model(s) on a 3D map, for flight planning purposes, and/or the like).

In this way, UAV management device 260 can perform one or more actions to cause a recommendation regarding the proposed flight plan to be provided.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Some implementations, described herein, include a UAV management device 260 that is capable of receiving obstacle data from various sources (e.g., via crowdsourcing, from trusted sources (e.g., government authorities), from third-party sources that maintain one or more private or public repositories of information regarding obstacles, from UAVs that can detect obstacles while in flight and report such obstacles in real-time (or near real-time), and/or the like), and performing one or more actions to cause recommendations (regarding proposed flight plans of UAVs) that are based on the obstacle data to be provided (e.g., to adjust, in real-time (or near real-time), flight paths of UAVs that are already in flight, to configure mission planning systems associated with UAVs (e.g., pre-flight), and/or the like). In this way, UAV management device 260 can maintain and leverage a large repository of static and/or dynamic obstacles for use with flight plans relating to and/or routing of UAVs, which decreases a risk of collision of a UAV during flight (thereby increasing a success rate of the flight and improving the safety of the UAV and others (e.g., other UAVs, pedestrians, and/or the like) that might be in or near the flight path of the UAV). In addition, this reduces or eliminates a need for a UAV to include certain sensors that would otherwise be needed to detect obstacles during a flight, which reduces the cost of the UAV (including costs associated with the design, manufacture, and testing of the UAV), and conserves power, processing, and memory resources of the UAV associated with the use of such sensors.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
receive obstacle data from a plurality of sources, the obstacle data including location data associated with a plurality of obstacles;
process, based on the location data, the obstacle data to associate the plurality of obstacles with one or more airspace voxels, that represent one or more three-dimensional (3D) portions of airspace;
receive flight parameters relating to a proposed flight plan of an unmanned aerial vehicle (UAV) through airspace represented by a set of airspace voxels;
determine whether the set of airspace voxels includes any of the one or more airspace voxels; and
perform, based on determining whether the set of airspace voxels includes any of the one or more airspace voxels, one or more actions to cause a recommendation, regarding the proposed flight plan, to be provided to the UAV or to a client device associated with the UAV,
the recommendation being based on one or more factors associated with the plurality of obstacles.

2. The device of claim 1, wherein the one or more factors associated with the plurality of obstacles include one or more weightings associated with the plurality of obstacles,
wherein each of the one or more weightings indicates a measure of reliability and/or accuracy of information regarding an obstacle of the plurality of obstacles.

3. The device of claim 1, wherein the one or processors, when performing the one or more actions, are further to:
perform the one or more actions to cause information regarding the one or more factors to be provided to the UAV or to the client device to enable the UAV or the client device to determine an adjustment to the proposed flight plan.

4. The device of claim 1, wherein the obstacle data further includes size information associated with the plurality of obstacles or time stamp information associated with the plurality of obstacles; and
wherein the one or more processors, when processing the obstacle data, are to:
process the obstacle data to associate the plurality of obstacles with the one or more airspace voxels further based on the size information or the time stamp information.

5. The device of claim 1, wherein the recommendation includes a recommended flight plan that is associated with a probability of successful flight that satisfies a threshold probability.

6. The device of claim 1, wherein the plurality of sources includes:
one or more government-related sources of obstacle data;
one or more third-party sources that maintain one or more repositories of obstacle data;
one or more sources associated with crowdsourcing; or
one or more UAVs.

7. The device of claim 1, wherein the one or more processors, when processing the obstacle data to associate the plurality of obstacles with the one or more airspace voxels, are to:
process the obstacle data to map the plurality of obstacles to the one or more airspace voxels.

8. A non-transitory computer-readable medium storing instructions, the instructions comprising:
one or more instructions that, when executed by one or more processors, cause the one or more processors to:
receive obstacle data from a plurality of sources,
the obstacle data including location data associated with a plurality of obstacles;
map, based on the location data, the plurality of obstacles identified in the obstacle data to one or more airspace voxels;
receive flight parameters relating to a proposed flight plan of an unmanned aerial vehicle (UAV) through airspace represented by a set of airspace voxels;
determine whether the set of airspace voxels includes any of the one or more airspace voxels; and
perform, based on determining whether the set of airspace voxels includes any of the one or more airspace voxels, one or more actions to cause a recommendation, regarding the proposed flight plan, to be provided to the UAV or to a client device associated with the UAV,
the recommendation being based on one or more factors associated with the plurality of obstacles.

9. The non-transitory computer-readable medium of claim 8, wherein the one or more factors associated with the plurality of obstacles include one or more weightings associated with the plurality of obstacles,
wherein each of the one or more weightings indicates a measure of reliability and/or accuracy of information regarding an obstacle of the plurality of obstacles.

10. The non-transitory computer-readable medium of claim 8, wherein the obstacle data further includes size information associated with the plurality of obstacles or time stamp information associated with the plurality of obstacles; and
wherein the one or more instructions, when executed by the one or more processors, further cause the one or more processors to:
process the obstacle data to associate the plurality of obstacles with the one or more airspace voxels based on the size information or the time stamp information.

11. The non-transitory computer-readable medium of claim 8, wherein the one or more instructions, that cause the one or more processors to perform the one or more actions, when executed by the one or more processors, cause the one or more processors to:
perform the one or more actions to cause information regarding the one or more factors to be provided to the UAV or to the client device to enable the UAV or the client device to determine an adjustment to the proposed flight plan.

12. The non-transitory computer-readable medium of claim 8, wherein the one or more instructions, when executed by the one or more processors, further cause the one or more processors to:
aggregate the obstacle data in one or more data structures after the obstacle data is received.

13. The non-transitory computer-readable medium of claim 8, wherein the recommendation includes a recommended flight plan that is associated with a probability of successful flight that satisfies a threshold probability.

14. The non-transitory computer-readable medium of claim 8, wherein the plurality of sources includes:
one or more government-related sources of obstacle data;
one or more third-party sources that maintain one or more repositories of obstacle data;
one or more sources associated with crowdsourcing; or
one or more UAVs.

15. A method, comprising:
receiving, by a device, obstacle data from a plurality of sources,
the obstacle data including location data associated with a plurality of obstacles;
processing, by the device and based on the location data, the obstacle data to associate the plurality of obstacles with one or more airspace voxels, that represent one or more three-dimensional (3D) portions of airspace;
receiving, by the device, flight parameters relating to a proposed flight plan of an unmanned aerial vehicle (UAV) through airspace represented by a set of airspace voxels;
determining, by the device, whether the set of airspace voxels includes any of the one or more airspace voxels; and
performing, by the device and based on determining whether the set of airspace voxels includes any of the one or more airspace voxels, one or more actions to cause a recommendation, regarding the proposed flight plan, to be provided to the UAV or to a client device associated with the UAV,
wherein the recommendation is based on a measure of reliability and/or accuracy of information regarding an obstacle of the plurality of obstacles.

16. The method of claim 15, further comprising:
providing, for display on a user interface of the client device, a 3D representation of the obstacle.

17. The method of claim 15, wherein the information further includes size information associated with the plurality of obstacles or time stamp information associated with the plurality of obstacles; and
wherein the method further comprises:
processing the obstacle data to associate the plurality of obstacles with the one or more airspace voxels further based on the size information or the time stamp information.

18. The method of claim 15, wherein the flight parameters include one or more of:
aircraft or UAV parameters,
pilot parameters, or
analysis parameters relating to entity preferences.

19. The method of claim 15, wherein the recommendation includes a recommended flight plan that is associated with a probability of successful flight that satisfies a threshold probability.

20. The method of claim 15, wherein the plurality of sources includes:
one or more government-related sources of obstacle data;
one or more third-party sources that maintain one or more repositories of obstacle data;
one or more sources associated with crowdsourcing; or
one or more UAVs.

* * * * *